US011778250B2

(12) United States Patent
Ganesan et al.

(10) Patent No.: US 11,778,250 B2
(45) Date of Patent: Oct. 3, 2023

(54) TECHNIQUES FOR REDUCING STREAMING START LATENCY

(71) Applicant: DISH Network Technologies India Private Limited, Bangalore (IN)

(72) Inventors: Vimalraj Ganesan, Bangalore (IN); Rakesh Eluvan, Bangalore (IN); Amit Kumar, Bangalore (IN)

(73) Assignee: DISH NETWORK TECHNOLOGIES INDIA PRIVATE LIMITED, Karnataka (IN)

( * ) Notice: Subject to any disclaimer, the term of this patent is extended or adjusted under 35 U.S.C. 154(b) by 0 days.

(21) Appl. No.: 17/579,461

(22) Filed: Jan. 19, 2022

(65) Prior Publication Data

US 2023/0247238 A1 Aug. 3, 2023

(51) Int. Cl.
*H04N 21/2343* (2011.01)
*H04N 21/2347* (2011.01)

(52) U.S. Cl.
CPC ..... *H04N 21/2343* (2013.01); *H04N 21/2347* (2013.01)

(58) Field of Classification Search
CPC .......... H04N 21/2343; H04N 21/2347
See application file for complete search history.

(56) References Cited

U.S. PATENT DOCUMENTS

2002/0170053 A1\* 11/2002 Peterka .............. H04N 21/2225 380/278
2021/0360295 A1\* 11/2021 Sze ...................... H04N 21/234

\* cited by examiner

*Primary Examiner* — Yassin Alata
(74) *Attorney, Agent, or Firm* — Seed IP Law Group LLP

(57) ABSTRACT

Methods and apparatuses for improving the delivery of streamed audiovisual content derived from over-the-air digital television signals by reducing streaming start latency are described. In response to detecting a request from a client device to begin a streaming session for a video stream captured by an over-the-air antenna, a streaming device in communication with the client device via a wired or wireless networking connection may transmit a reduced resolution version of the video stream to the client device, establish encryption and decryption keys for a secure connection with the client device while the reduced resolution version of the video stream is transmitted to the client device, communicate a point in time after which an encrypted version of the video stream will be transmitted to the client device, and transmit the encrypted version of the video stream to the client device starting at the point in time.

17 Claims, 8 Drawing Sheets

Networked Computing Environment 100

TECHNIQUES FOR REDUCING STREAMING START LATENCY

BACKGROUND

High-definition television (HDTV) digital broadcasting provides increased picture and audio quality compared with traditional standard-definition television (SDTV) broadcasting. Besides the increased resolution, HDTV also uses a 16:9 aspect ratio (e.g., 1920×1080 pixels) instead of the 4:3 aspect ratio used with SDTV broadcasts. Today, consumers in many metropolitan areas are able to receive numerous over-the-air HDTV channels using an HDTV antenna. The over-the-air (OTA) HDTV antenna may connect to an electronic streaming device that takes the captured local HDTV broadcasts and streams them over a wireless or wired network to client devices (e.g., smartphones and laptop computers) within a home. Besides streaming HDTV content to one or more client devices within the home, the electronic streaming device may also provide digital video recorder (DVR) functionality that enables HDTV content received via the HDTV antenna to be recorded and subsequently streamed to a client device in response to a request from the client device.

BRIEF SUMMARY

Systems and methods for reducing the amount of time it takes from when a request for audiovisual content is made to the time it takes for the audiovisual content to be subsequently transmitted or streamed are provided. A reduction in the streaming start latency for audiovisual content that is streamed to a client device (e.g., a mobile electronic device) allows the audiovisual content to be consumed or displayed by the client device with less delay. The streaming start latency may comprise a delay between a first point in time when a client device requests to receive audiovisual content and a second point in time when the requested audiovisual content is received by the client device. In response to receiving a request from a client device to begin streaming audiovisual content to the client device, a streaming device in communication with the client device via a wired or wireless networking connection may transmit a reduced resolution version of the audiovisual content to the client device, establish various parameters (e.g., encryption and decryption keys) for a secure connection with the client device while the reduced resolution version of the audiovisual content is transmitted to the client device, communicate a point in time after which an encrypted version of the audiovisual content will be transmitted to the client device, and transmit the encrypted version of audiovisual content to the client device on or before the point in time. According to some embodiments, the technical benefits of the disclosed systems and methods for reducing the streaming start latency of streamed audiovisual content include reduced wait time in receiving and displaying audiovisual content derived from over-the-air digital television signals and the ability to provide a content streaming environment with a near real-time display of live action events on client devices.

In some embodiments, a streaming device may determine and set a time delay for sending an encrypted version of the audiovisual content to the client device based on the number of audiovisual content streams being concurrently streamed or processed by the streaming device and/or the estimated data transfer time for transmitting the encrypted version of the audiovisual content to the client device. One technical benefit of setting the time delay for sending the encrypted version of the audiovisual content based on the number of audiovisual content streams being concurrently streamed by the streaming device and/or the estimated data transfer time for transmitting the encrypted version of the audiovisual content to the client device is that the streaming start latency may be minimized on a per client device basis or on a per streaming content request basis subject to processor and memory usage for the streaming device, processor and memory usage for the client device, and the networking bandwidth for one or more networks connecting the streaming device with the client device.

BRIEF DESCRIPTION OF THE SEVERAL VIEWS OF THE DRAWINGS

Like-numbered elements may refer to common components in the different figures.

DETAILED DESCRIPTION

Figure 1:
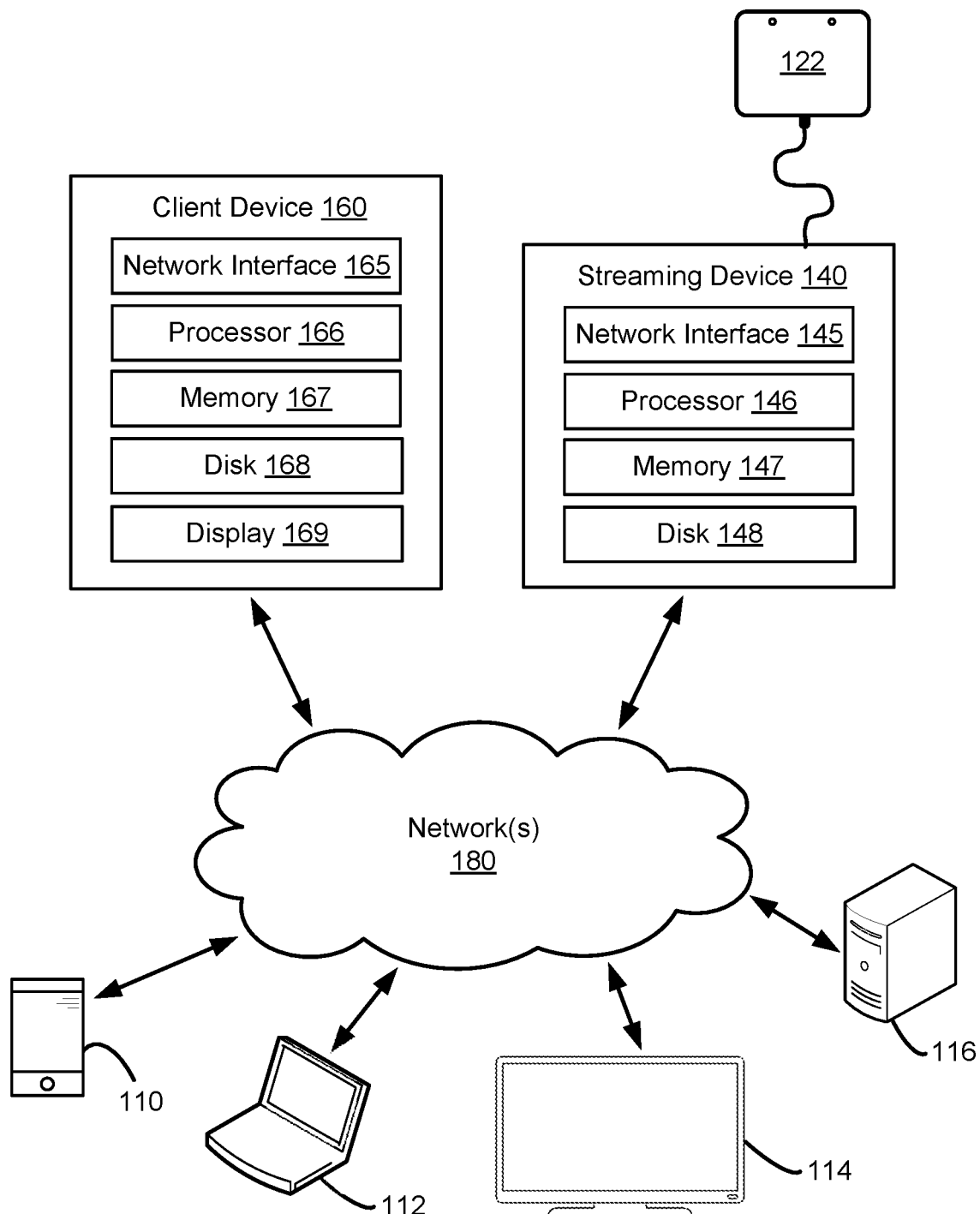
FIG. 1 depicts one embodiment of a networked computing environment.

Technology is described for improving the delivery of streamed audiovisual content derived from over-the-air digital television signals by reducing the streaming start latency to client devices. Upon receiving a request from a client device (e.g., a smartphone or tablet computer) to begin a streaming session for a video stream captured by an OTA HDTV antenna, a streaming device in communication with the client device via a wired or wireless networking connection may first transmit a reduced resolution version of the video stream to the client device, establish security parameters for a secure connection with the client device (e.g., determining encryption and decryption keys for passing encrypted messages) while the reduced resolution version of the video stream is transmitted to the client device, communicate a point in time (or a range of times) after which an encrypted version of the video stream will be transmitted to the client device, and generate and transmit the encrypted version of the video stream to the client device subsequent to the point in time. The streaming start latency may be minimized while ensuring streaming content security by first transmitting a modified and unencrypted version of the video stream to the client device to allow the video stream to be displayed on the client device without requiring an encryption handshake or decryption of the received video stream and then transmitting an encrypted version of the video stream to the client device after the client device has been configured to decrypt the encrypted video stream. The streaming start latency may comprise the delay between a first point in time when a client device requests to view the video stream and a second point in time when the requested video stream is displayed on the client device. Minimizing the streaming start latency allows the transfer of the requested audiovisual content to occur in a near real-time fashion and promotes the real-time display of live action events to the client device.

In some embodiments, upon detection of a triggering event to establish a new session with a client device for streaming audiovisual content or to update encryption parameters (e.g., encryption and decryption keys may be periodically updated or refreshed) for streaming content using a secure channel, a streaming electronic device may determine a time delay for transmitting an encrypted version of the audiovisual content to the client device and transmit the time delay to the client device while a modified (e.g., a lower resolution) and unencrypted version of the audiovisual content is transmitted to the client device. A triggering event to establish a new secure session may occur when a networking connection to the client device changes (e.g., from sending and receiving data over a wired network connection to a wireless network connection). The streaming electronic device (or streaming device) may determine a number of video streams currently being streamed by the streaming electronic device, a client identifier for the client device (e.g., a unique alphanumeric identifier for the client device), a client type for the client device (e.g., the client device classifies as a portable electronic device or a non-mobile desktop computer), and an estimated data transfer time for transmitting the audiovisual content to the client device. The data transfer time may be estimated based on a network bandwidth and/or a history of previous data transfers to the client device. The streaming electronic device may determine the time delay based on the number of video streams currently being streamed by the streaming electronic device, the client identifier for the client device, the client type for the client device, and/or the estimated data transfer time for transmitting the audiovisual content to the client device. Thus, the same client device may receive different time delays over time and different client devices may receive different time delays prior to receiving encrypted audiovisual content.

One technical issue with streaming audiovisual content over a secure channel is that the amount of time required to perform an encryption handshake for determining an encryption key and a corresponding decryption key (e.g., between 200 ms and 450 ms depending on the client device's connectivity) and the amount of time required to generate an encrypted version of the audiovisual content using the encryption key obtained from the encryption handshake negatively impacts the streaming start latency for displaying video streams on client devices. One technical benefit of quickly transmitting a lower resolution unencrypted version of a video stream upon detection of a streaming start signal followed by an encrypted version of the video stream is that the time penalty for performing data encryption and handshaking operations may be removed from the streaming start latency. Furthermore, a technical benefit of setting the time delay for transmitting the encrypted version of the video stream based on the number of video streams currently being streamed by a streaming electronic device, a client identifier for a client device, and/or the estimated data transfer time for transmitting the encrypted version of the video stream to the client device is that the time delay for transmitting the encrypted version of the video stream to the client device is adjustable based on client device and networking conditions and the time delay may be minimized on a per client device basis.

In one embodiment, a streaming device may determine whether to set a fixed time delay before streaming encrypted audiovisual content or to provide a timing window specified using a minimum time delay (or a first point in time) and a maximum time delay (or a second point in time subsequent to the first point in time) to a client device prior to streaming the encrypted audiovisual content and allow the client device to determine when the encrypted audiovisual content will be transmitted by the streaming device. The client device may utilize a messaging channel to transfer an encryption ready signal to the streaming device within the timing window indicating that the client device is configured and available to decrypt encrypted audiovisual content.

In some cases, in response to detecting that a client device has requested a video stream to be streamed to the client device, a streaming device may pass through the video stream with a first video coding format (e.g., MPEG-2) for a first period of time (e.g., for 200 ms) and then transmit the video stream with a second video coding format (e.g., MPEG-4) for a second period of time subsequent to the first period of time. One technical benefit of passing through the video stream with the first video coding format for the first period of time is that the transcoder pipeline delay or the time to generate the video stream with the second video coding format may be hidden. The streaming device may detect that the video resolution and/or the video coding format for an unencrypted video stream needs to be changed prior to streaming encrypted audiovisual content to the client device due to the number of video streams being concurrently processed by the streaming device exceeding a threshold number of video streams (e.g., more than four video streams are being concurrently processed), the signal to noise ratio of a digital television signal falling below a threshold value, and/or the network bandwidth (or other measure of network performance related to the maximum capacity of a wired or wireless communications link to transmit data over a network connection in a given amount of time) has fallen below a threshold bandwidth (e.g., is less than 2 Mbps).

Prior to streaming encrypted audiovisual content, a streaming device may convert a first unencrypted video stream encoded using a first coding format (e.g., MPEG-2) into a second unencrypted video stream encoded using a second coding format (e.g., MPEG-4) different from the first coding format. The streaming device may also convert a first unencrypted video stream with a first video resolution into a second unencrypted video stream with a second video resolution different from the first video resolution. The second video resolution (e.g., 1280×720 pixels) may be less than the first video resolution (e.g., 1920×1080 pixels). The streaming device may adjust the video resolution of an unencrypted video stream if the number of video streams being concurrently streamed by the streaming device exceeds a threshold number of video streams (e.g., is greater than four video streams). Upon detection that the number of video streams being concurrently streamed by the streaming device exceeds a threshold number of video streams, the streaming device may adjust both the video resolution of an unencrypted video stream and the compression format. For example, if the number of video streams being concurrently streamed by the streaming device is greater than five, then the streaming device may reduce the video resolution (e.g., cut the resolution in half) prior to streaming the reduced resolution video stream.

FIG. 1 depicts one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile smartphone 110, laptop computing device 112, network-connected digital television 114, hardware server 116, streaming device 140, and client device 160. In some embodiments, the plurality of computing devices may include other computing devices not shown. In some embodiments, the plurality of computing devices may include more than or less than the number of computing devices depicted in FIG. 1. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks. Each network of the one or more networks 180 may include hubs, bridges, routers, switches, and wired transmission media such as a wired network or direct-wired connection.

In some embodiments, computing devices within the networked computing environment 100 may comprise real hardware computing devices or virtual computing devices, such as one or more virtual machines. Networked storage devices within the networked computing environment 100 may comprise real hardware storage devices or virtual storage devices, such as one or more virtual disks. The real hardware storage devices may include non-volatile and volatile storage devices.

Networked computing environment 100 may provide a cloud computing environment for one or more computing devices. Cloud computing may refer to Internet-based computing, wherein shared resources, software, and/or information are provided to the one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The client device 160 may comprise a portable electronic device, a mobile smartphone, a laptop computer, a tablet computer, a desktop computer, a network-connected digital television, or an electronic device with a display screen. One embodiment of client device 160 includes a network interface 165, processor 166, memory 167, disk 168, and display 169 all in communication with each other. Network interface 165 allows client device 160 to connect to one or more networks 180. Network interface 165 may include a wireless network interface and/or a wired network interface. Processor 166 allows client device 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, or Flash). Memory 167 may comprise a hardware storage device. Display 169 may comprise a touch-screen display or a light emitting diode (LED) display.

In some cases, the server 116 may comprise a server within a data center. The data center may include one or more servers, such as server 160, in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

The streaming device 140 may comprise a network-connected electronic device. One embodiment of streaming device 140 includes a network interface 145, processor 146, memory 147, and disk 148 all in communication with each other. Network interface 145 allows streaming device 140 to connect to one or more networks 180. Network interface 145 allows streaming device 140 to connect to one or more client devices, such as client device 160, via the one or more networks 180. Network interface 145 may include a wireless network interface and/or a wired network interface. Processor 146 allows streaming device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, or Flash). Memory 147 may comprise a hardware storage device. The processor 146 and memory 147 may be configured to allow the streaming device 140 to encrypt video streams, to reduce the video resolution of video streams, and to perform transcoding operations. The streaming device 140 is connected to an antenna 122 for receiving over-the-air digital television signals. The streaming device 140 may stream video streams received from the antenna 122 to client devices located across a local area network or a wide area network. The antenna 122 may comprise an over-the-air HDTV antenna for receiving HDTV digital broadcasting signals.

HDTV digital broadcasting has several limitations due to the nature of terrestrial systems that broadcast HDTV signals. For example, terrestrial broadcasting systems typically transmit radio frequency (RF) signals from antenna towers that are located in different geographical regions and any obstructing features (e.g., mountains and buildings) between the transmitting antenna (or transmitter) and a receiving antenna (or receiver) may block or weaken the transmitted signals. Moreover, the quality of transmitted signals may be impacted by the presence of electromagnetic interference (EMI) caused by nearby power lines, RF interference caused by nearby radio transmitters, and other sources of RF noise. An HDTV receiver may only be able to reliably decode HDTV content that is received with a signal strength or signal to noise ratio that is sufficient to decode the transmitted HDTV content with an acceptable or correctable number of errors.

In one embodiment, the streaming device 140 may include a wired networking interface (e.g., an Ethernet networking interface), a wireless interface (e.g., a WiFi networking interface), a 1 TB hard drive, a 1 GB SDRAM, one or more OTA tuners, and one or more hardware processors with dedicated video processing and transcoding capability. The streaming device 140 may include a dual channel transcoder for transcoding high-definition television programs (e.g., from MPEG-2 to MPEG-4 or H.264) from two transport streams. An MPEG transport stream (or transport stream) may comprise a digital container format for the transmission and storage of audio and video information. In some cases, the transport stream may carry data for multiple programs and channels and may include packetized elementary streams with error correction and synchronization pattern features for ensuring data transmission integrity. The transport stream may include one or more video packetized elementary streams, one or more audio packetized elementary streams, scheduling information, and closed captioning information.

In some embodiments, the streaming device 140 may detect that a client device, such as client device 160, has requested to receive a live video stream captured by antenna 122, and in response, the streaming device 140 may transmit a reduced resolution version of the live video stream to the client device, determine encryption and decryption keys for passing encrypted messages to the client device while the reduced resolution version of the live video stream is transmitted to the client device, communicate a point in time (or a time period) after which an encrypted version of the live video stream will be transmitted to the client device, and then generate and transmit the encrypted version of the live video stream to the client device subsequent to the point in time (or subsequent to the time period).

A video stream or the electronic files or packets comprising portions of the video stream may be encrypted using symmetric encryption or asymmetric encryption (e.g., public-key cryptography) prior to being transmitted to a client device. In one example, video stream packets may be encrypted using a symmetric key encryption algorithm (e.g., AES or triple DES) or an algorithm that utilizes symmetric and asymmetric keys to encrypt data (e.g., PGP). In another example, transport stream packet payloads may be encrypted prior to transmission using a symmetric cryptographic algorithm (e.g., AES) or an asymmetric cryptographic algorithm (e.g., RSA). A symmetric session key allows the client device and the streaming device to use the same session key to encrypt and decrypt audiovisual content and other data.

Figure 2A:
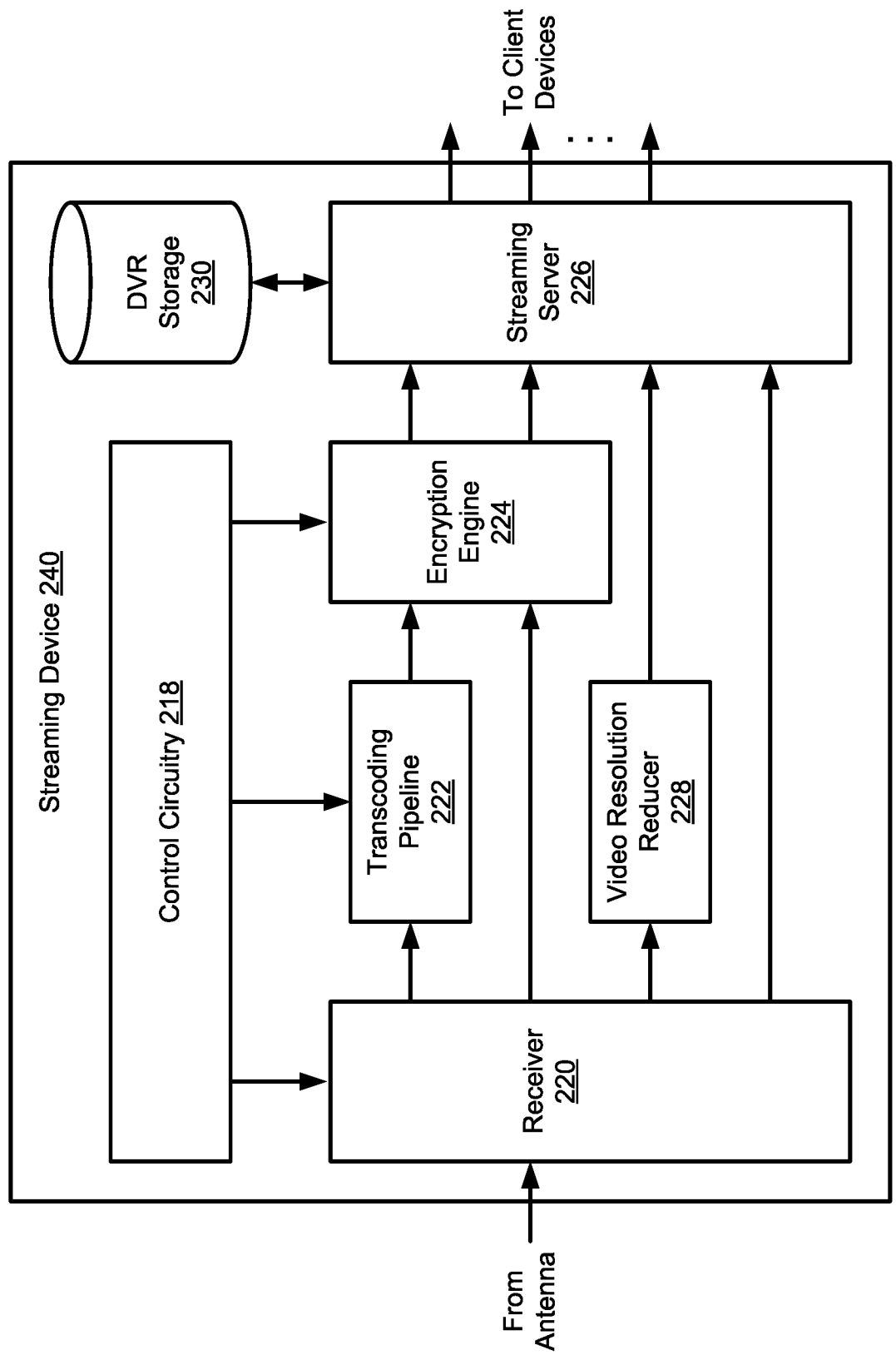
FIG. 2A depicts one embodiment of a streaming device for streaming audiovisual content to one or more client devices.

FIG. 2A depicts one embodiment of a streaming device 240 for streaming audiovisual content to one or more client devices. In one example, the streaming device 240 may correspond with the streaming device 140 in FIG. 1. As depicted, the streaming device 240 includes a receiver 220 for receiving over-the-air digital television signals from an antenna, a transcoding pipeline 222, an encryption engine 224, a video resolution reducer 228, control circuitry 218, a streaming server 226, and a digital video recorder (DVR) storage 230. The receiver 220 may receive a video stream encoded using a first video coding format (e.g., MPEG-2) from an over-the-air HDTV antenna. The video resolution reducer 228 may generate a video stream with a reduced video resolution (e.g., cutting the number of pixels in half). The video resolution reducer 228 may include transrating circuitry configured to generate the video stream with the reduced video resolution. In one example, a dedicated transrating pipeline may generate the video stream with the reduced resolution faster than a transcoding pipeline. The transcoding pipeline 222 may be used to generate a video stream encoded using a second video coding format (e.g., MPEG-4 or H.264) different from the first video coding format. The transcoding pipeline 222 may include circuitry configured to generate the video stream encoded using the second video coding format. The control circuitry 218 may be implemented using an application-specific integrated circuit, a microcontroller (e.g., by executing appropriate instructions), a field-programmable gate array, or a reconfigurable circuit. The control circuitry 218 may configure the receiver 220, the transcoding pipeline 222, and/or the encryption engine 224 to perform processes discussed herein. The encryption engine 224 may encrypt packets or packet payloads corresponding with either the video stream encoded using the first video coding format or the video stream encoded using the second video coding format. The streaming server 226 may stream an encrypted version of the video stream encoded using the first video coding format, an encrypted version of the video stream encoded using the second video coding format, an unencrypted version of the video stream encoded using the first video coding format, or a reduced resolution version of the video stream encoded using the first video coding format.

In some cases, the streaming device 240 may convert a video stream from a first video coding format (e.g., from an MPEG-2 or H.262 format) to a second video coding format (e.g., to an MPEG-4 or H.264 format) different from the first video coding format prior to generating an encrypted version of the video stream. The second video coding format may utilize a higher compression rate and/or a lower bit rate compared with the first video coding format. A transcoding process to convert video content from the first video coding format to the second video coding format may decompress the encoded video content into an uncompressed format and then re-compress the uncompressed video content using the second video coding format. The transcoding pipeline 222 may perform the digital-to-digital conversion in which data that is encoded using the first video coding format is encoded using the second video coding format. The streaming device 240 may also reduce the resolution of images within a received video stream (e.g., by reducing the number of pixels per image) and/or adjust the image aspect ratio for the video stream (e.g., adjust the aspect ratio from 4:3 to 16:9) prior to generating an encrypted version of the video stream. The streaming device 240 may also convert a video stream from the first video coding format to a second video coding format and then transmit an unencrypted version of the video stream using the second video coding format prior to generating an encrypted version of the video stream.

Figure 2B:
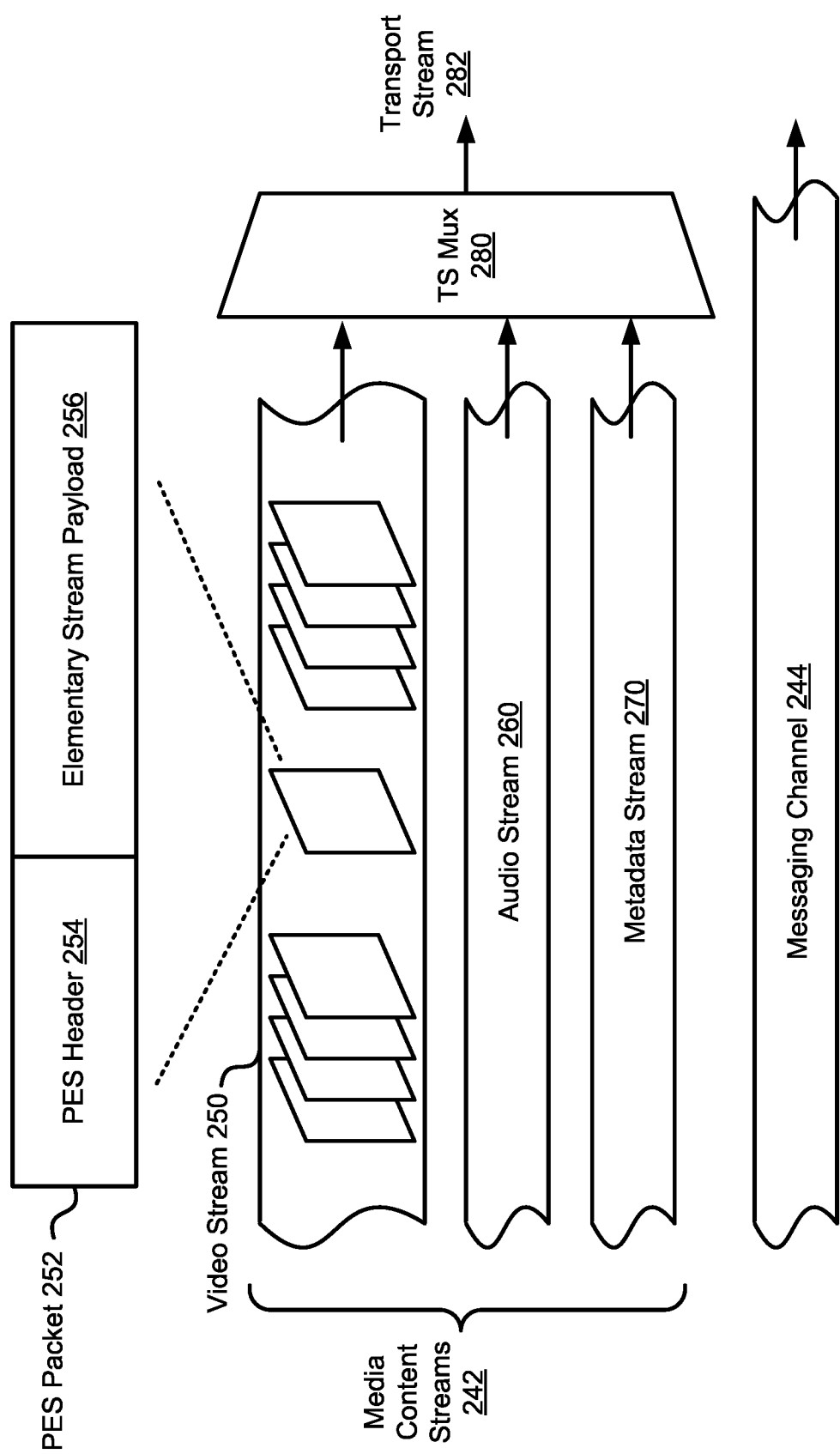
FIG. 2B depicts one embodiment of a digital container format and circuitry for transmitting audiovisual content from a streaming device to one or more client devices.

FIG. 2B depicts one embodiment of a digital container format and circuitry for transmitting audiovisual content from a streaming device to one or more client devices. The digital container format may allow the media content streams 242 to be combined and transported over a single packetized transport stream 282. The transport stream 282 may be received by a client device, such as client device 160 in FIG. 1, and demultiplexed to generate audio and video streams for display on the client device. Circuitry including the transport stream multiplexer (TS MUX) 280 may be included within a streaming server, such as the streaming server 226 of FIG. 2A, to generate the transport stream 282. Transport stream multiplexing may refer to a process in which two or more elementary streams are converted into a single transport stream. The media content streams 242 may include audiovisual content for multiple digital television programs received from an over-the-air HDTV antenna. The substreams of the media content streams 242 may include a video stream 250, a corresponding audio stream 260, and a corresponding metadata stream 270. The metadata stream 270 may include closed captioning and subtitling information. In one example, the media content streams 242 may include a first audio stream for a first language and a second audio stream for a second language that may be synchronized to a common video stream. Elementary streams (e.g., video and audio streams) may be packetized into packetized elementary streams and each packetized elementary stream (PES) may be divided into transport stream packets for transport over the transport stream 282.

The media content streams 242 may comprise multiple packetized elementary streams that are time division multiplexed by the transport stream multiplexer (TS MUX) 280 to generate the transport stream 282. Each packetized elementary stream (PES) may comprise a stream of PES packets and each PES packet 252 may include a PES packet header 254 and a PES packet payload 256. The PES packet 252 may have a variable packet length (e.g., up to a maximum length of 64 KB) while transport stream packets may have a fixed length (e.g., each transport stream packet may be 188 bytes in length). Each PES packet may be partitioned into a number of transport stream packets as a PES packet that represents an access unit (a frame) in an elementary stream is usually larger than the transport stream packet size (e.g., PES packet length is usually larger than 188 bytes). Each transport stream packet may include a packet identifier (PID) to associate the transport stream packet with the PES packet from which it originated. The PES packet header 254 may include packet identifier information that distinguishes between audio and video PES packets. In some embodiments, each video PES packet may correspond with a video frame.

The PES packet header 254 may also include timestamp information for the PES packet payload 256 to allow for the synchronization of a program's audiovisual content. Audio-video synchronization may be performed using timestamp information incorporated into the headers of both video and audio PES packets. The transport stream 282 may contain multiple programs (e.g., associated with different digital television channels) and each program may have its own time base. The timestamp information within the PES packet header 254 may include a Decoding Timestamp (DTS), a Presentation Timestamp (PTS) (e.g., used with MPEG-2), and a Composite Timestamp (CTS) (e.g., used with MPEG-4). The PES packet header 254 may also include reference clock information and/or timestamp information corresponding with an elementary stream clock reference (ESCR) from which decoders of PES streams may derive reference timing. In some cases, a reference clock may be periodically transmitted in the transport stream. In one example, a Program Clock Reference (PCR) may be periodically transmitted in the adaption field of a transport stream packet (e.g., every 100 ms). In some cases, audio and video elementary streams may be synchronized by combining the PCR with the PTS (which may specify a time relative to the PCR) that resides in the PES packet header.

As depicted in FIG. 2B, a separate messaging channel 244 may be used to transmit and receive messages between a streaming device and one or more client devices. For example, the messaging channel 244 may be used by a streaming device to set maximum and minimum times for receiving encrypted audiovisual content and a client device may communicate an encryption ready signal to the streaming device to indicate that the client device is configured and available to decrypt encrypted audiovisual content.

Figure 3:
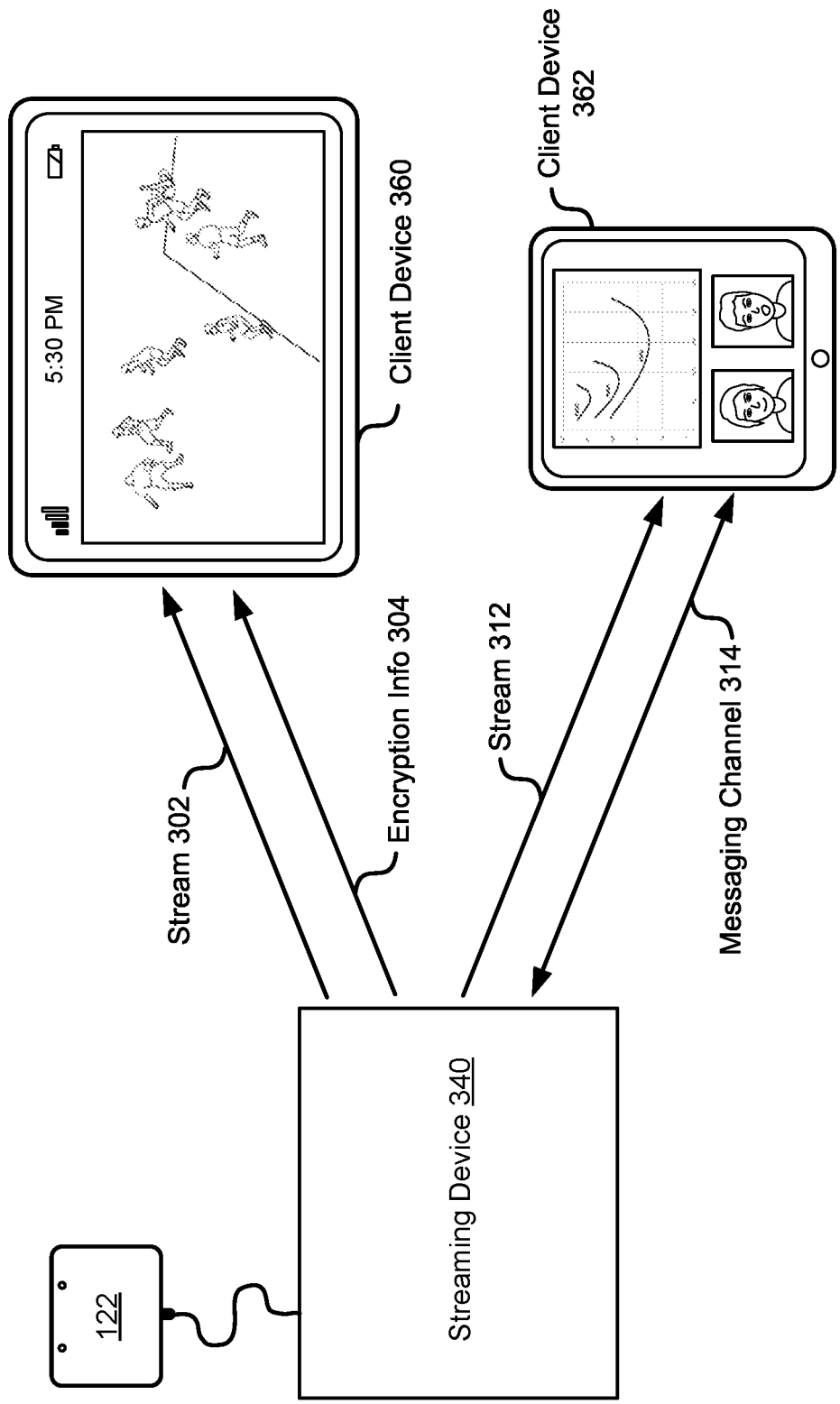
FIG. 3 depicts one embodiment of a streaming device concurrently streaming audiovisual content to a plurality of client devices.

FIG. 3 depicts one embodiment of a streaming device 340 concurrently streaming audiovisual content to a plurality of client devices including client device 360 and client device 362. The streaming device may concurrently stream different digital television channels or different programs to two or more client devices. In one example, the streaming device 340 may correspond with the streaming device 140 in FIG. 1 and the client device 360 may correspond with the client device 160 in FIG. 1. Upon detecting a request from a client device for a particular video stream or upon detecting that a new session for streaming the particular video stream to the client device should be established, the streaming device 340 may determine whether to set a fixed time delay before streaming the requested encrypted video stream or to provide a timing window corresponding with a minimum point in time and a maximum point in time during which the client device may signal via an encryption ready signal to the streaming device that the client device is ready to accept the encrypted video stream. If the client device does not provide the encryption ready signal by the maximum point in time, then the streaming device 340 may transmit the encrypted video stream starting at the maximum point in time.

The streaming device 340 may simultaneously capture or receive one or more digital television channels using an OTA HDTV antenna, such as antenna 122. In one embodiment, the client device 360 may request a live stream of a first digital television channel from the streaming device 340 and in response the streaming device 340 may generate a reduced resolution version of the live stream of the first digital television channel and transmit the reduced resolution video stream 302 to the client device 360. In some cases, the stream 302 may correspond with a reduced resolution version of the video stream 250 in FIG. 2B or a reduced resolution version of a video stream transported within the transport stream 282 in FIG. 2B. While the reduced resolution video stream 302 is streamed to the client device 360, the streaming device 340 may perform an encryption handshake with the client device 360 to determine encryption and decryption keys or may transmit decryption information and a corresponding start time for receiving an encrypted video stream within a metadata stream, such as metadata stream 270 in FIG. 2B, or via a messaging channel, such as messaging channel 244 in FIG. 2B. The streaming device may perform the encryption handshake or unidirectionally transmit encryption information 304 to the client device 360 via a messaging channel, such as messaging channel 244 in FIG. 2B. In response to the client device 360 signaling its ability to accept the encrypted video stream, the streaming device 340 may encrypt the video stream without a reduction in the video resolution and transmit the encrypted video stream to the client device 360.

In one embodiment, the client device 360 may read packet header information to determine whether audiovisual content received from the streaming device 340 is unencrypted or encrypted. The packet header information transmitted to the client device 360 may specify a point in time after which audiovisual content transmitted to the client device 360 will be encrypted. Alternatively, the packet header information transmitted to the client device 360 may specify a starting point in time and a fixed time delay relative to the starting point in time after which the audiovisual content transmitted to the client device 360 will be encrypted. A decryption key for decrypting the encrypted audiovisual content may be transferred to the client device 360 within the packet header information.

While the streaming device 340 is streaming the encrypted video stream to the client device 360, the client device 362 may request a live stream of a second digital television channel and in response the streaming device 340 may generate a reduced resolution version of the live stream of the second digital television channel and transmit the reduced resolution version of the live stream of the second digital television channel to the client device 362 via stream 312. While the reduced resolution version of the second digital television channel is streamed to the client device 362, the streaming device 340 may perform an encryption handshake with the client device 362 to determine encryption and decryption keys or may transmit decryption information and a corresponding time window for receiving an encrypted version of the second digital television channel via stream 312.

The streaming device 340 may perform the encryption handshake or transmit encryption information to the client device 362 via a bidirectional messaging channel 314. The client device 362 may transmit an encryption ready signal to the streaming device 340 via the bidirectional messaging channel 314 to indicate that the client device 362 is ready to accept encrypted audiovisual content. In response to the client device 362 signaling its ability to accept an encrypted video stream, the streaming device 340 may generate an encrypted version of the second digital television channel (e.g., using an encryption key determined during an encryption handshake) and transmit the encrypted version of the second digital television channel to the client device 362. The client device 362 may receive the encrypted version of the second digital television channel via a transport stream, such as transport stream 282 in FIG. 2B, demultiplex the transport stream and decrypt the encrypted version of the second digital television channel using a decryption key (e.g., using a decryption key determined during the encryption handshake or transmitted to the client device 362 via messaging channel 314). The client device 362 may then present or display a live stream of the second digital television channel using a display of the client device 362.

Figure 4A:
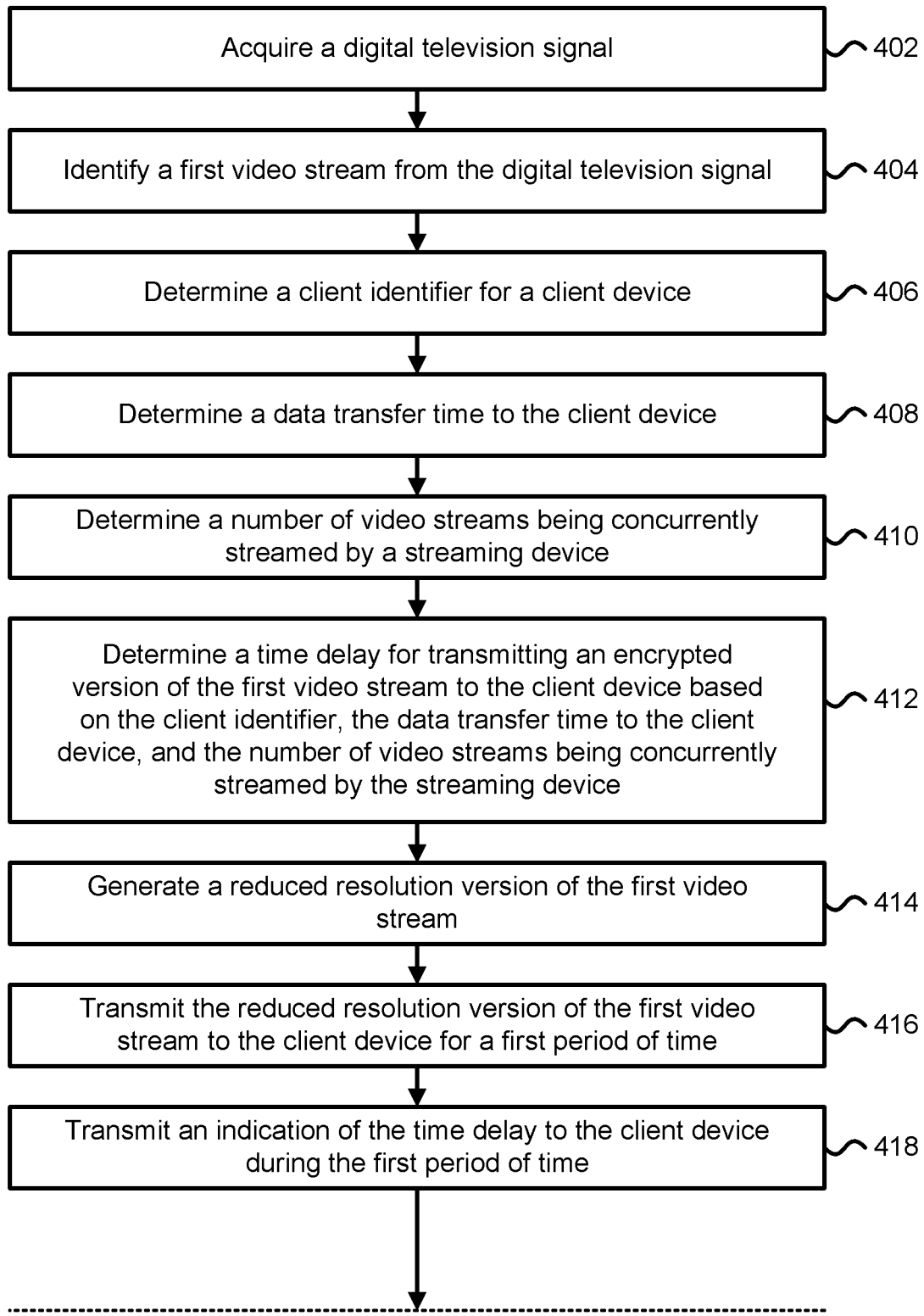
FIGS. 4A-4B depict a flowchart describing one embodiment of a process for reducing streaming start latency.
Figure 4B:
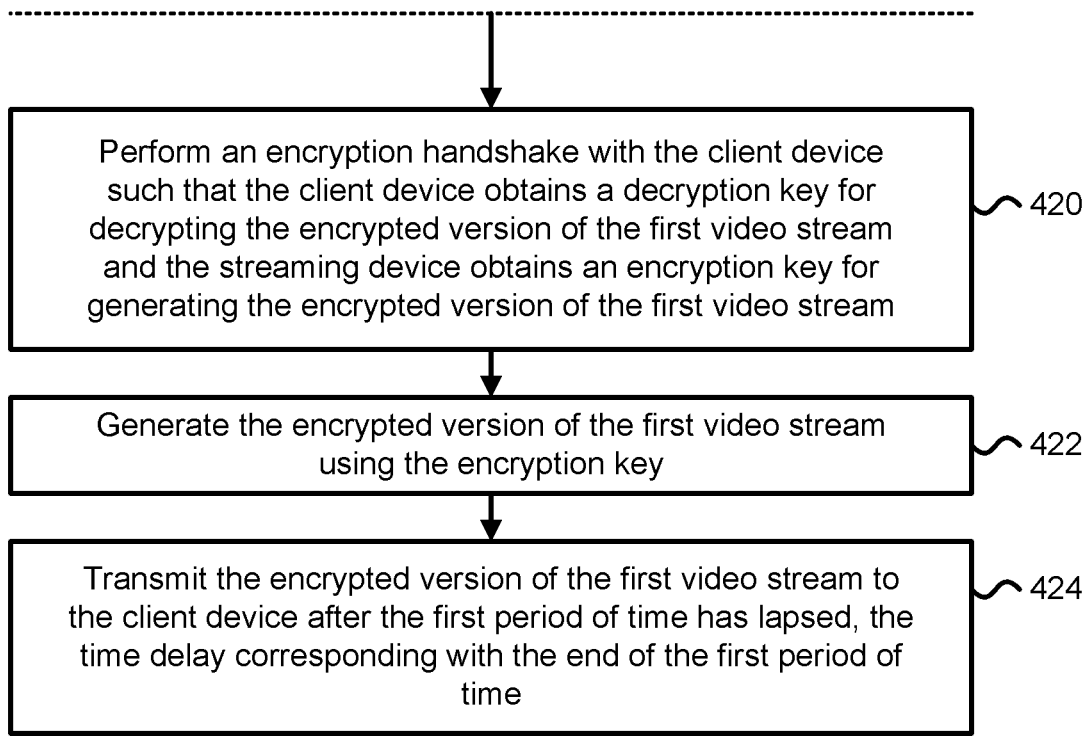

FIGS. 4A-4B depict a flowchart describing one embodiment of a process for reducing streaming start latency. In one embodiment, the process of FIGS. 4A-4B may be performed by a streaming electronic device, such as the streaming device 140 in FIG. 1 or the streaming device 240 in FIG. 2A. In another embodiment, the process of FIGS. 4A-4B may be performed using one or more virtual machines and/or one or more virtual storage devices.

In step 402, a digital television signal is acquired. The digital television signal may be acquired from an over-the-air HDTV antenna, such as antenna 122 in FIG. 1. The digital television signal may be received at a receiver of a streaming device, such as receiver 220 in FIG. 2A, and include a plurality of local HDTV broadcast signals. In step 404, a first video stream is identified from the digital television signal. The first video stream may correspond with a live stream of a particular digital television channel. In step 406, a client identifier for a client device is determined. The client device may correspond with client device 160 in FIG. 1 and the client identifier may comprise an alphanumeric identifier that uniquely identifies the client device. The client identifier may be used to determine a type of electronic device, such as whether the client device comprises a portable electronic device or a battery operated electronic device. Portable electronic devices and battery operated electronic devices may require additional time to perform an encryption handshake compared with other electronic devices. In step 408, a data transfer time from a streaming device to the client device is determined. The data transfer time may be determined based on a network bandwidth of a wired or wireless network connecting the streaming device to the client device and/or one or more previous data transfer times from the streaming device to the client device. In one example, the data transfer time from the streaming device to the client device may comprise the worst-case or the longest data transfer time out of the last three data transfers from the streaming device to the client device.

In step 410, a number of video streams being concurrently streamed by a streaming device, such as the streaming device 140 in FIG. 1, is determined. The number of video streams being concurrently streamed may correspond with the number of different digital television channels being simultaneously streamed from the streaming device. A greater number of video streams being concurrently processed by the streaming device may place greater demands on the compute and memory resources of the streaming device and cause an increase in the amount of time required by the streaming device to generate and transmit another video stream. In step 412, a time delay for transmitting an encrypted version of the first video stream to the client device is determined based on the client identifier, the data transfer time to the client device, and/or the number of video streams being concurrently streamed by the streaming device.

In one example, the time delay for transmitting the encrypted version of the first video stream to the client device may be determined and/or set based on an average of the last three data transfer times to the client device. In another example, the time delay for transmitting the encrypted version of the first video stream to client device may be set to a first time delay (e.g., two seconds) if the number of video streams being concurrently streamed by the streaming device is less than or equal to a threshold number of streams and set to a second time delay (e.g., four seconds) greater than the first time delay if the number of video streams being concurrently streamed by the streaming device is greater than the threshold number of streams (e.g., is greater than four streams).

In step 414, a reduced resolution version of the first video stream is generated. The reduced resolution version may be generated using a video resolution reducer, such as the video resolution reducer 228 in FIG. 2A. In one example, the streaming device may reduce the resolution of a video stream by more than 2× or reduce the resolution of the first video stream from a video resolution of 1920×1080 pixels to a video resolution of 1280×720 pixels. The video resolution may correspond with a measure of the total number of pixels per video frame or the width by height in pixels for images within the video stream. In step 416, the reduced resolution version of the first video stream is transmitted to the client device for a first period of time (e.g., for two seconds). In step 418, an indication of the time delay determined in step 412 is transmitted to the client device during the first period of time. The indication of the time delay may be transmitted to the client device within a packet header or via a messaging channel.

In step 420, an encryption handshake is performed between the streaming device and the client device such that the client device obtains a decryption key for decrypting the encrypted version of the first video stream and the streaming device obtains an encryption key for generating the encrypted version of the first video stream. In some cases, the streaming device may generate or determine the encryption and decryption keys used for encrypting and decrypting the first video stream and unilaterally transmit the decryption key to the client device. In step 422, the encrypted version of the first video stream is generated by the streaming device using an encryption key determined during the encryption handshake. In step 424, the encrypted version of the first video stream is transmitted to the client device after the first period of time has elapsed. The time delay determined in step 412 may correspond with the end of the first period of time or the last point in time within the first period of time. In one embodiment, the streaming device may transmit a point in time to the client device at which the client device will stop receiving the reduced resolution version of the first video stream and instead begin receiving the encrypted version of the first video stream.

Figure 4C:
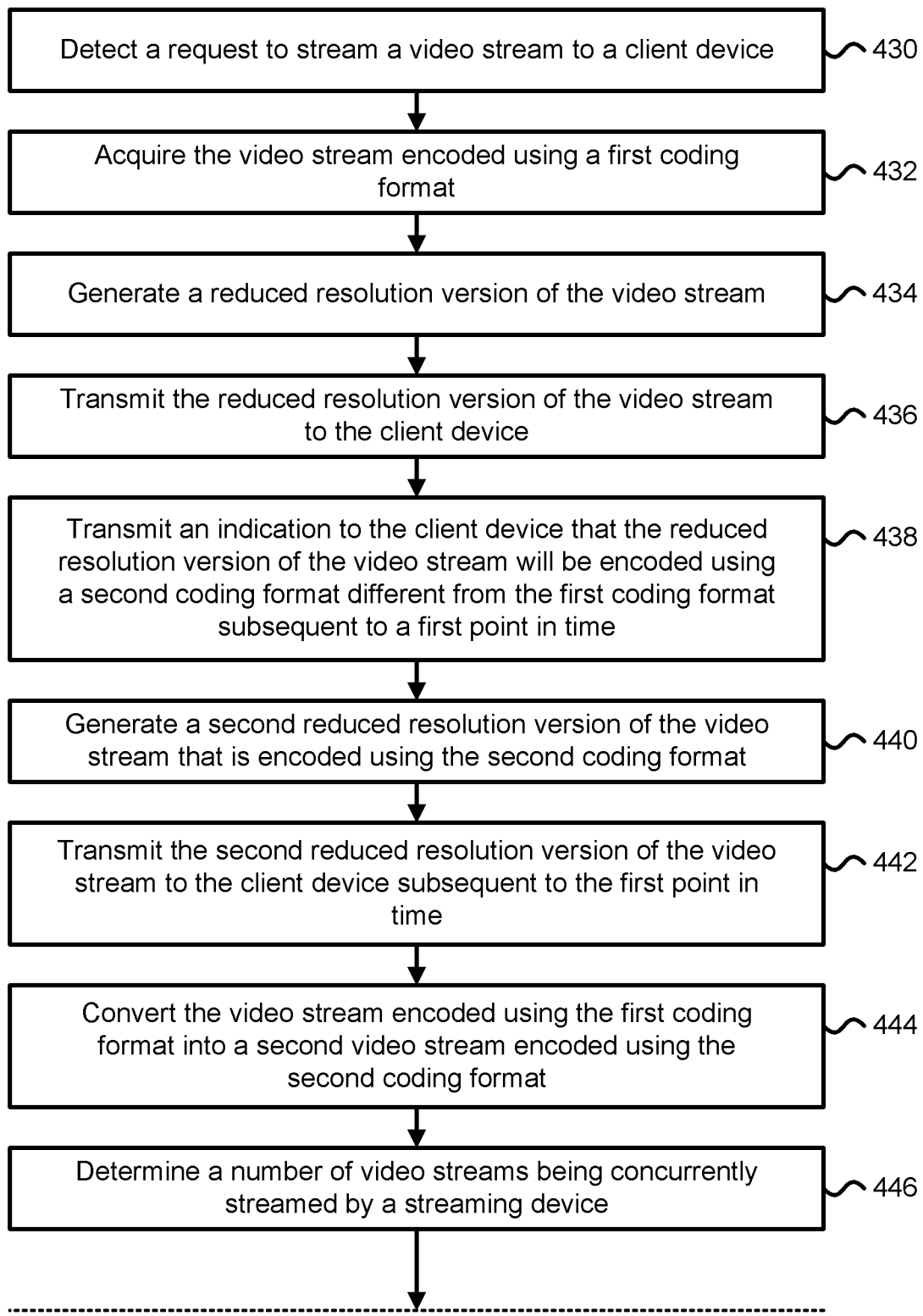
FIGS. 4C-4D depict a flowchart describing an alternative embodiment of a process for reducing streaming start latency.
Figure 4D:
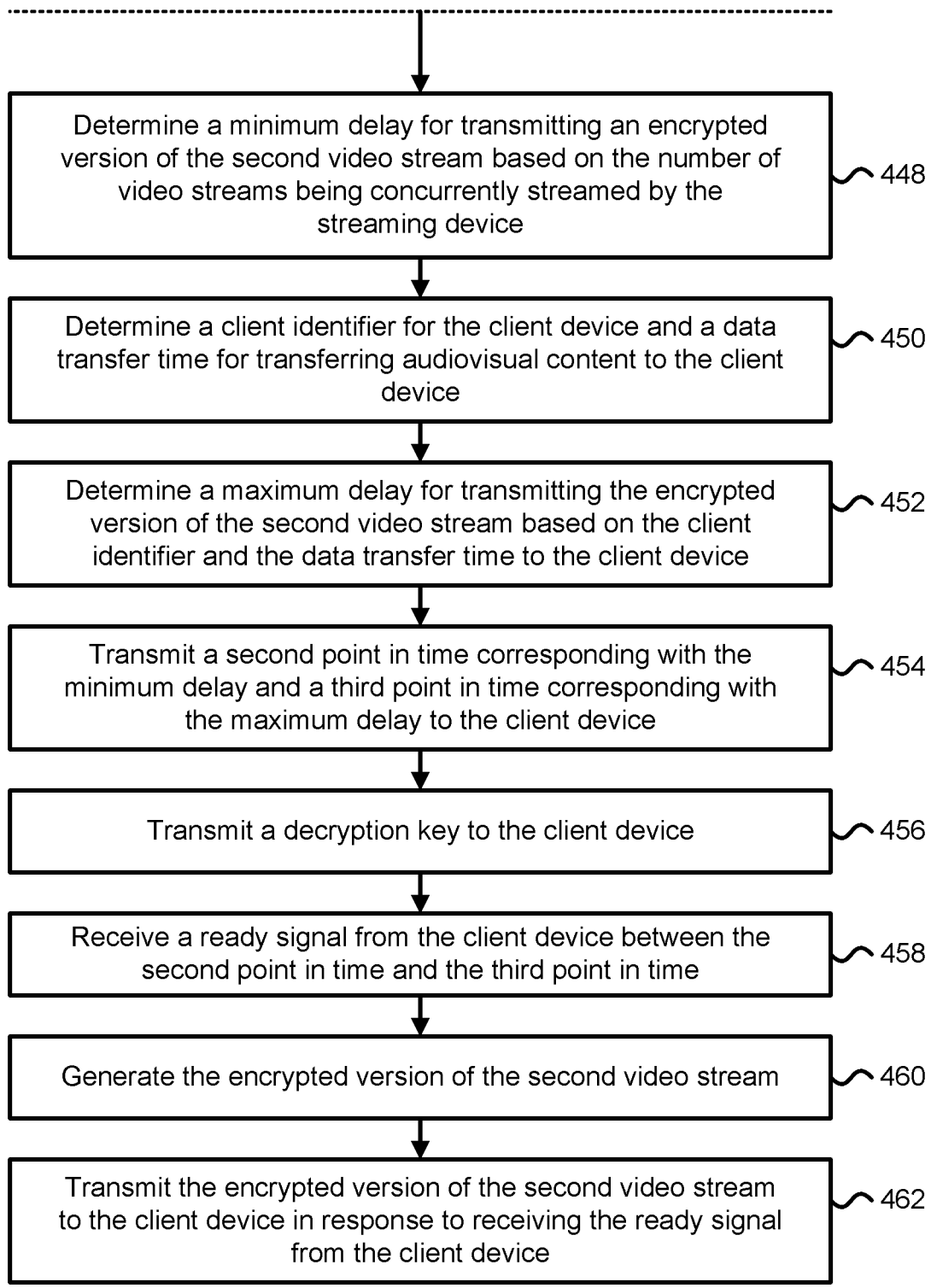

FIGS. 4C-4D depict a flowchart describing an alternative embodiment of a process for reducing streaming start latency. In one embodiment, the process of FIGS. 4C-4D may be performed by a streaming electronic device, such as the streaming device 140 in FIG. 1 or the streaming device 240 in FIG. 2A. In another embodiment, the process of FIGS. 4C-4D may be performed using one or more virtual machines and/or one or more virtual storage devices executed by a computing device.

In step 430, a request to stream a video stream to a client device is detected. In step 432, the video stream encoded using a first coding format is acquired. The video stream may be acquired by a streaming device in response to detecting the request to stream the video stream to the client. The video stream may derive from a digital television signal acquired from an over-the-air HDTV antenna, such as antenna 122 in FIG. 1. The first coding format may correspond with an MPEG-2 format. In step 434, a reduced resolution version of the video stream is generated. The video stream encoded using the first coding format may be acquired by a streaming device, such as streaming device 140 in FIG. 1, and the streaming device may reduce the resolution of the video stream by cutting or removing more than half of the pixels from images of the video stream. In step 436, the reduced resolution version of the video stream is transmitted to a client device, such as client device 160 in FIG. 1.

In step 438, an indication that the reduced resolution version of the video stream will be encoded using a second coding format different from the first coding format subsequent to a first point in time is transmitted to the client device. The second coding format may correspond with an MPEG-4 format or H.264. One technical benefit of first transmitting the video stream encoded using the first coding format and then transmitting the video stream encoded using the second coding format after a short period of time is that the client device may display the video stream before the video stream using the second coding format is generated by the streaming device.

In step 440, a second reduced resolution version of the video stream that is encoded using the second coding format is generated. In step 442, the second reduced resolution version of the video stream is transmitted to the client device subsequent to the first point in time. In step 444, the video stream encoded using the first coding format is converted into a second video stream encoded using the second coding format. In this case, the resolution of the video stream acquired in step 432 is unaltered and is not reduced when generating the second video stream encoded using the second coding format.

In step 446, a number of video streams being concurrently streamed or processed by a streaming device is determined. In step 448, a minimum delay for transmitting an encrypted version of the second video stream is determined based on the number of video streams being concurrently streamed or processed by the streaming device. In this case, the minimum delay may be set to one second if the number of video streams being concurrently streamed by the streaming device is not greater than a threshold number of streams (e.g., is not greater than four); otherwise, the minimum delay may be set to two seconds if the number of video streams being concurrently streamed by the streaming device is greater than the threshold number of streams.

In step 450, a client identifier for the client device and a data transfer time for transferring audiovisual content to the client device is determined. In step 452, a maximum delay for transmitting the encrypted version of the second video stream is determined based on the client identifier and the data transfer time to the client device. In one example, the maximum delay for waiting to transmit the encrypted version of the second video stream may be set based on the highest data transfer time or the last data transfer time to the client device. In step 454, a second point in time corresponding with the minimum delay and a third point in time corresponding with the maximum delay are transmitted to the client device. In this case, the streaming device may communicate a timing window to the client device during which the client device can transmit an encryption ready signal to the streaming device to indicate that the client device is available to receive the encrypted version of the second video stream.

In step 456, a decryption key is transmitted to the client device. The decryption key may be transmitted from the streaming device to the client device using a messaging channel or by embedding the decryption key within a packet header. The decryption key may be determined during an encryption handshake process between the streaming device and the client device performed while reduced resolution video streams are transferred from the streaming device to the client device. In step 458, a ready signal from the client device is received between the second point in time and the third point in time. In this case, the ready signal may be received by the streaming device prior to the third point in time corresponding with the maximum delay. In response to receiving the ready signal from the client device, the streaming device may transmit the encrypted version of the second video stream to the client device before the third point in time. In step 460, the encrypted version of the second video stream is generated by the streaming device. In step 462, the encrypted version of the second video stream is transmitted to the client device in response to receiving the ready signal from the client device. The streaming device may indicate the presence of encrypted audiovisual content by including an indicator within packet headers of PES packets transmitted to the client device.

One embodiment of the disclosed technology includes identifying a video stream to be transmitted to a client device, generating a reduced resolution version of the video stream using a streaming device, transmitting the reduced resolution version of the video stream from the streaming device to the client device, determining an encryption key while the reduced resolution version of the video stream is transmitted to the client device, determining a point in time at which the client device will receive an encrypted version of the video stream, transmitting an indication of the point in time to the client device (e.g., by embedding the indication of the point in time within a packet header or by transferring the indication of the point in time to the client device via a messaging channel), generating the encrypted version of the video stream using the streaming device, and transmitting the encrypted version of the video stream from the streaming device to the client device on or before (e.g., starting at) the point in time.

The disclosed technology may further include determining a number of video streams being concurrently streamed or processed by the streaming device and determining the point in time based on the number of video streams being concurrently streamed or processed by the streaming device. The disclosed technology may further include determining a data transfer time to the client device and setting the point in time based on the data transfer time to the client device.

The data transfer time to the client may be determined based on a previous data transfer time from the streaming device to the client device.

One embodiment of the disclosed technology comprises an electronic device including a storage device (e.g., a semiconductor memory) and one or more processors in communication with the storage device. The storage device configured to store a video stream. The one or more processors configured to detect a request from a client device to stream the video stream to the client device and transmit a reduced resolution version of the video stream to the client device in response to detection of the request. The one or more processors configured to determine an encryption key while the reduced resolution version of the video stream is transmitted to the client device and determine a point in time at which the client device will receive an encrypted version of the video stream. The one or more processors configured to transmit an indication of the point in time to the client device and generate the encrypted version of the video stream using the encryption key. The one or more processors configured to transmit the encrypted version of the video stream to the client device at the point in time.

The disclosed technology may further include one or more processors configured to convert an encoding of the reduced resolution version of the video stream from a first coding format to a second coding format and transmit a second reduced resolution version of the video stream encoded with the second coding format to the client device prior to the point in time.

One embodiment of the disclosed technology includes acquiring a video stream encoded using a first coding format, generating a reduced resolution version of the video stream, transmitting the reduced resolution version of the video stream to a client device, determining a decryption key while the reduced resolution version of the video stream is transmitted to the client device, determining a maximum point in time for receiving an encryption ready signal from the client device, transmitting the decryption key and an indication of the maximum point in time to the client device while the reduced resolution version of the video stream is transmitted to the client device, detecting that the encryption ready signal was transmitted by the client device prior to the maximum point in time, generating an encrypted version of the video stream encoded using a second coding format different from the first coding format, and transmitting the encrypted version of the video stream to the client device prior to the maximum point in time.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each block in a flowchart may correspond with a program module or portion of computer program code, which may comprise one or more computer-executable instructions for implementing the specified functionality. In some implementations, the functionality noted within a block may occur out of the order noted in the figures. For example, two blocks shown in succession may, in fact, be executed substantially concurrently, or the blocks may sometimes be executed in the reverse order, depending upon the functionality involved. In some implementations, the functionality noted within a block may be implemented using hardware, software, or a combination of hardware and software.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for reducing streaming start latency, comprising:
    identifying a video stream to be transmitted to a client device;

generating, at a streaming device, a reduced resolution version of the video stream;
transmitting the reduced resolution version of the video stream from the streaming device to the client device;
while the reduced resolution version of the video stream is transmitted to the client device;
  obtaining a history of previous data transfers to the client device;
  determining, using the history of previous data transfers, a data transfer time based on an amount of time to determine an encryption key, determine a decryption key, and perform an encryption handshake with the client device;
  determining the encryption key and the decryption key;
  determining a number of current data streams being received by the client device;
  determining a time delay window in which the client device requests transmission of an encrypted version of the video stream based on the data transfer time from the streaming device to the client device and the number of current data streams being received by the client device; and
  transmitting the decryption key and an indication of the time delay window to the client device;
generating, at the streaming device, the encrypted version of the video stream subsequent to transmitting the decryption key and subsequent to receiving the request from the client device during the time delay window requesting transmission of the encrypted version of the video steam; and
transmitting the encrypted version of the video stream from the streaming device to the client device.

2. The method of claim 1, further comprising:
converting an encoding of the reduced resolution version of the video stream from a first coding format to a second coding format; and
transmitting a second reduced resolution version of the video stream encoded with the second coding format from the streaming device to the client device prior to transmitting the encrypted version of the video stream from the streaming device to the client device.

3. The method of claim 1, wherein:
estimating the data transfer time from the streaming device to the client device based on a network bandwidth of a network connecting the streaming device to the client device.

4. The method of claim 1, wherein:
estimating the data transfer time from the streaming device to the client device based on a prior data transfer time from the streaming device to the client device.

5. The method of claim 1, further comprising:
determining a client identifier for the client device; and
setting the time delay window based on the client identifier.

6. The method of claim 1, further comprising:
detecting a request from the client device to stream the video stream to the client device, the transmitting the reduced resolution version of the video stream from the streaming device to the client device is performed in response to detecting the request from the client device to stream the video stream to the client device.

7. The method of claim 1, further comprising:
detecting that an encryption ready signal was received from the client device during the time delay window re requesting transmission of the encrypted version of the video stream from the streaming device to the client device.

8. The method of claim 1, further comprising:
capturing a digital television signal using an antenna, the streaming device is directly connected to the antenna, the identifying the video stream to be transmitted to the client device includes identifying the video stream from the digital television signal.

9. An electronic device for streaming audiovisual content, comprising:
a storage device configured to store a video stream; and
one or more processors in communication with the storage device configured to:
  detect a request from a client device to stream the video stream to the client device;
  transmit a reduced resolution version of the video stream to the client device in response to detection of the request;
  while the reduced resolution version of the video stream is transmitted to the client device:
    obtain a history of previous data transfers to the client device;
    determine, using the history of previous data transfers, a data transfer time based on an amount of time to determine an encryption key, determine a decryption key, and perform an encryption handshake with the client device,
    determine the encryption key and the decryption key;
    determine a point in time at which the client device will receive an encrypted version of the video stream based on the data transfer time to the client device; and
    transmit the decryption key and an indication of the point in time to the client device;
  generate the encrypted version of the video stream using the encryption key subsequent to transmission of the decryption key and the indication of the point in time to the client device; and
  transmit the encrypted version of the video stream to the client device at the point in time.

10. The electronic device of claim 9, wherein:
the one or more processors configured to convert an encoding of the reduced resolution version of the video stream from a first coding format to a second coding format and transmit a second reduced resolution version of the video stream encoded with the second coding format to the client device prior to the point in time.

11. The electronic device of claim 9, wherein:
the one or more processors configured to determine a number of video streams being concurrently streamed by the electronic device and determine the point in time based on the number of video streams being concurrently streamed by the electronic device.

12. The electronic device of claim 9, wherein:
the one or more processors configured to determine the data transfer time to the client device based on a network bandwidth.

13. The electronic device of claim 12, wherein:
the one or more processors configured to determine the data transfer time to the client device based on a previous data transfer time from the electronic device to the client device.

14. The electronic device of claim 12, wherein:
the one or more processors configured to determine the data transfer time to the client device based on a network bandwidth of a network connecting the electronic device to the client device.

15. A method for reducing streaming start latency, comprising:
- acquiring a video stream encoded using a first coding format;
- generating a reduced resolution version of the video stream;
- transmitting the reduced resolution version of the video stream to a client device;
- while the reduced resolution version of the video stream is transmitted to the client device:
  - determining a decryption key;
  - determining a number of current data streams being received by the client device;
  - determining a time delay window in which the client device transmits an encryption ready signal requesting transmission of an encrypted version of the video stream based on the number of current data streams being received by the client device;
  - transmitting the decryption key and an indication of the time delay window to the client device before a start of the time delay window;
  - detecting that the encryption ready signal was received from the client device during the time delay window;
- generating the encrypted version of the video stream encoded using a second coding format different from the first coding format subsequent to transmitting the decryption key to the client device; and
- transmitting the encrypted version of the video stream to the client device.

16. The method of claim 15, further comprising:
- determining the s data transfer time from the streaming device to the client device based on a network bandwidth; and
- determining the time delay window based on the data transfer time from the streaming device to the client device.

17. The method of claim 15, further comprising:
- performing an encryption handshake with the client device to determine the decryption key while transmitting the reduced resolution version of the video stream to the client device.

* * * * *